United States Patent [19]

Godsey, Jr.

[11] 3,899,979

[45] Aug. 19, 1975

[54] MAGNETIC SUSPENSION SYSTEMS FOR VEHICLES

[75] Inventor: Frank W. Godsey, Jr., St. Petersburg, Fla.

[73] Assignee: Buryan Associates, Scarsdale, N.Y.

[22] Filed: Feb. 22, 1973

[21] Appl. No.: 334,887

[52] U.S. Cl. ................ 104/148 MS; 104/148 LM
[51] Int. Cl. ............................................ B61b 13/08
[58] Field of Search ....... 104/148 MS; 335/302, 209

[56] References Cited
UNITED STATES PATENTS

| | | | |
|---|---|---|---|
| 2,348,967 | 5/1944 | Duby | 335/302 |
| 3,112,962 | 12/1963 | Lautzenhiser | 104/148 MS |
| 3,125,964 | 3/1964 | Silverman | 104/148 MS |
| 3,454,838 | 7/1969 | Defain | 335/209 |
| 3,611,944 | 10/1971 | Reder | 104/148 MS |
| 3,638,093 | 4/1971 | Ross | 104/148 MS |
| 3,783,794 | 1/1974 | Gopfert et al. | 104/148 MS |

FOREIGN PATENTS OR APPLICATIONS 707,032   5/1941   Germany ...................... 104/148 MS

*Primary Examiner*—M. Henson Wood, Jr.
*Assistant Examiner*—Reinhard J. Eisenzopf
*Attorney, Agent, or Firm*—Waters, Schwartz & Nissen

[57] ABSTRACT

Permanent magnets and electromagnets are secured to one another, endwise, to provide for magnetic suspension of a vehicle. The combined magnets are maintained attracted to a track, across a narrow air gap. The magnet arrangements are such that the attractive, magnetomotive force is provided mainly by the permanent magnets. Electric current for energization of the electromagnets is supplied exclusively, or mainly, to keep the air gap clearance substantially constant against a varying gravitational load on the vehicle.

7 Claims, 13 Drawing Figures

3,899,979

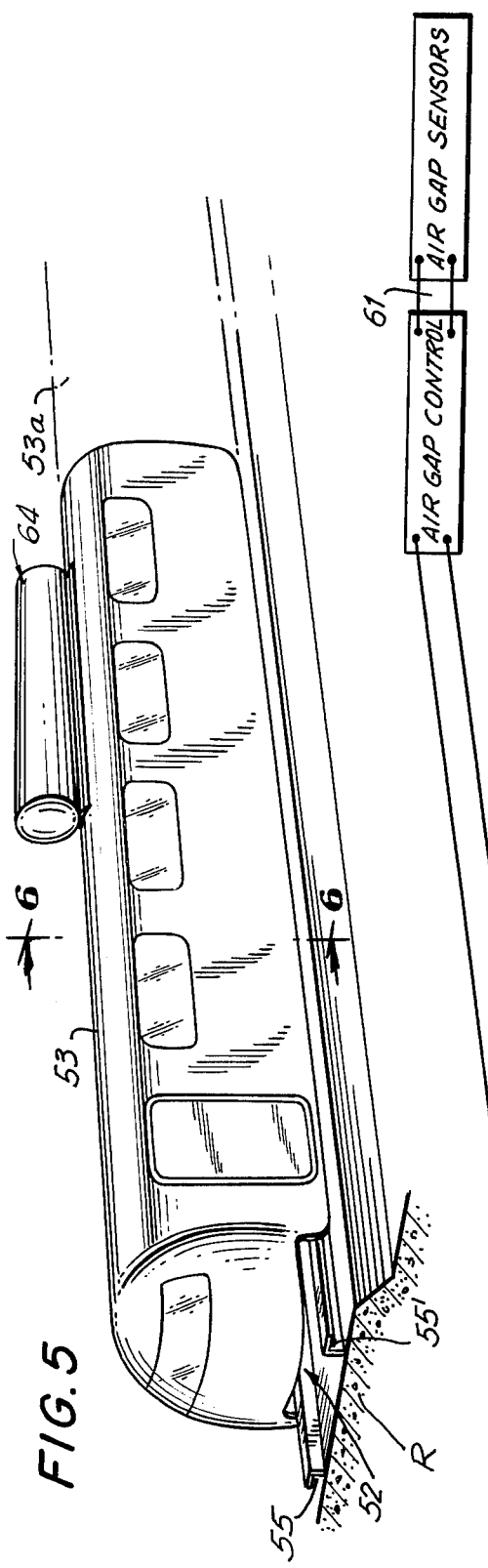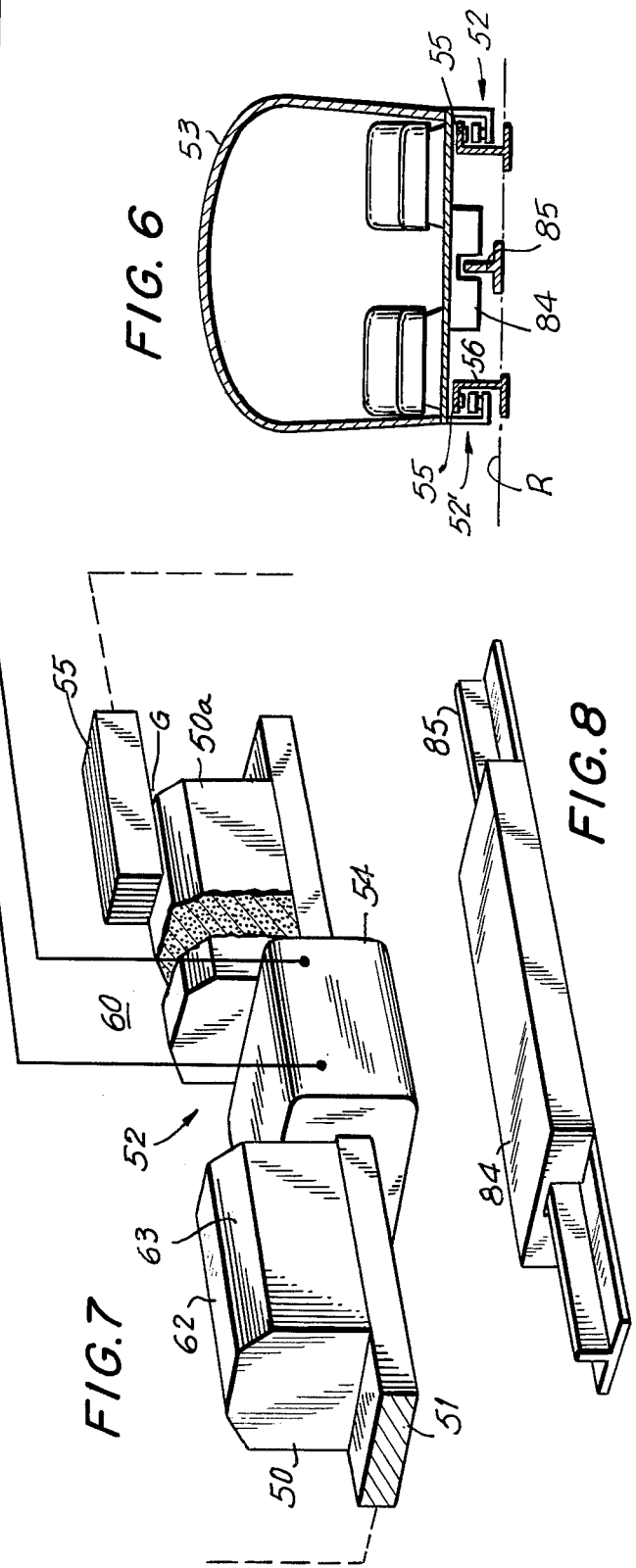

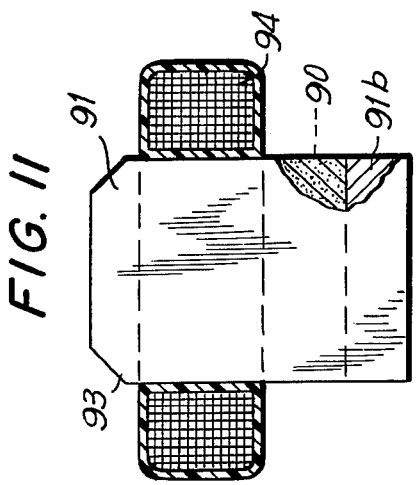
FIG. II
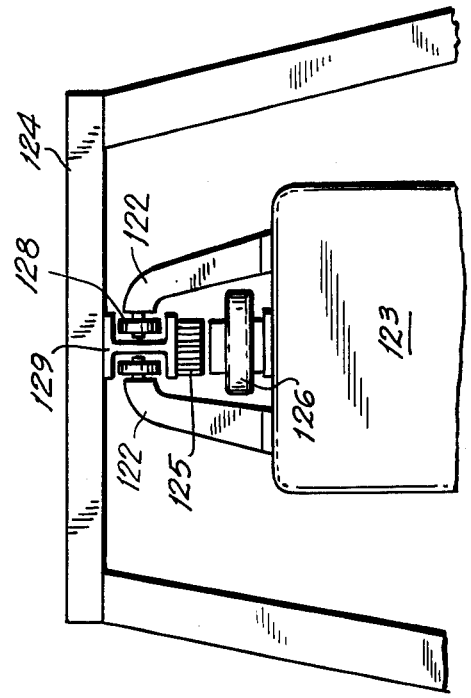
FIG. 12
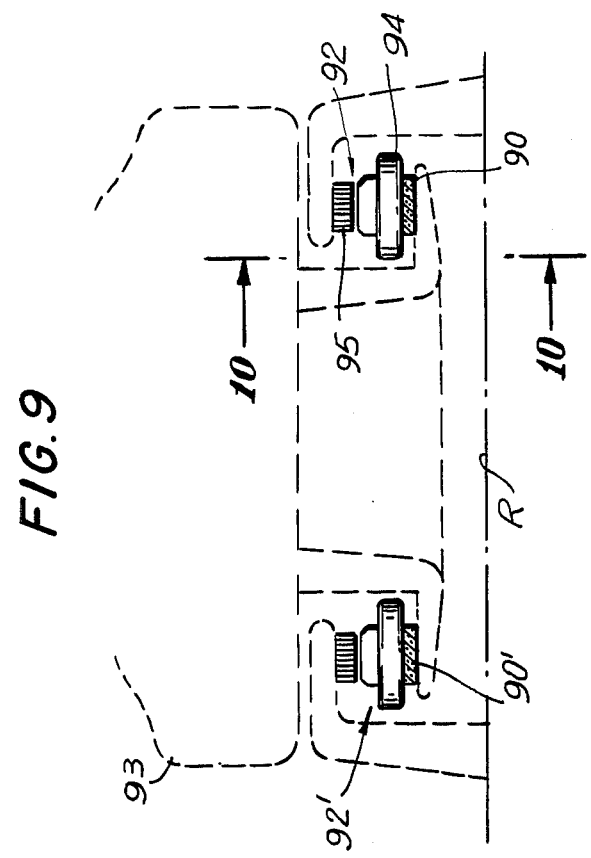
FIG. 9
FIG. 10
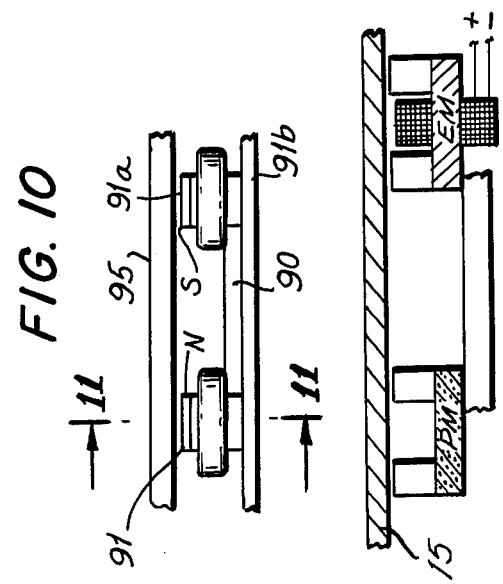
FIG. 13

MAGNETIC SUSPENSION SYSTEMS FOR VEHICLES

BACKGROUND AND NATURE OF THE INVENTION

Attempts have been made in recent times to overcome the ground friction of vehicles, including the rolling friction of wheels on a track or from other physical contacts with the roadway. This permits a faster operation, with greater safety and comfort and at lesser cost and for this purpose it has been proposed to operate a vehicle along a predetermined path as a wheelless car in its normal operation. "Magnetic suspension" is used as a means of avoiding physical rolling or sliding contact between the moving vehicle and the roadway.

In some of the magnetic suspension or hovering systems, effort has been directed toward the use of magnetic repulsion, either by mutual repulsion of permanent magnets on the road and on the vehicle, or by mutual repulsion between electromagnets on the moving vehicle and an upwardly facing, electrically conductive track on the ground. Those systems avoid the ground friction of rolling stock and also avoid the problems of air cushions, but they do this at a high cost for road magnets, cryogenically cooled super conducting electromagnets, or for power generation on the vehicle.

For these and other reasons, greater effectiveness and economy is being found in a magnetic vehicle suspension system, wherein the vehicle hangs from its track by magnetic attraction. The present invention is an improvement on that system.

Basically, magnetic suspension has been provided thus far by a downwardly facing, para-magnetic track located some distance above the ground, and by electromagnets secured to the vehicle, which magnets extended along the track at a level below it, and were separated from the track by a narrow air gap. Because of the proximity between magnet poles and track, the system of magnetic attraction is considerably more economical than the repulsion variants, and it requires neither motion of the vehicle, nor magnets in the tracks, to achieve suspension; however, because of the weights involved, the power required for the lift has still been considerable. As in the electromagnetic repulsion system, it may be necessary in all systems proposed thus far to use superconductive coils in order to minimize power consumption, generation of heat, and space requirements, among other things. Superconductive coils in turn require cryogenic equipment. Although the cost of providing and operating such equipment is lower in the magnetic attraction system than in the magnetic repulsion variant using electromagnet coils, cost and the complexities of the equipment are still very substantial.

It has now been found that the practicality of a magnetic attraction system for vehicle suspension can be increased by making a new use of permanent magnets. In accordance with the invention the present system no longer relies solely on electromagnets for the suspension of a vehicle, but also incorporates permanent magnet material in the magnetic circuit and thereby furnishes a substantial part, preferably a major part of the total required attractive magnetic force.

It is still necessary to make some use of electromagnetic effects. The reason is the magneto-attractive systems of suspension are vertically unstable and that variable energization of electromagnets is the best if not the only means to stabilize such a system. More specifically, as the length or clearance of the air gap, i.e., the distance between the track and the magnet poles decreases, the magnetic field strength and thus the lift provided by the magnetic field increases. Moreover the aforesaid lift increases in proportion to the square of this magnetic field strength. Therefore, unless field stabilization is exerted, magnetic attractive forces would exceed the weight of the vehicle, the air gap would be closed, physical contacts with large friction forces would result and the vehicle would thus be subjected to extreme braking effects. The vehicle must, in effect, move along with a narrow air gap under the track, avoiding all physical contact. In the former system of magneto-attractive vehicle suspension, both lift and air gap stabilization were provided by the use of large electromagnetic coils and cores with high power consumption. According to the invention relatively smaller currents are now sufficient, as the permanent magnets provide much or most of the magneto-motive force required for the lift; the electromagnets provide for mainly or only the necessary field stabilization. The cost, space, cooling, and other requirements of the electromagnets are drastically reduced thereby. Permanent magnets are relied upon for a substantial portion or most of the lift, and on electromagnets for a minor portion, or for that necessary for flux trimming operations of gap stabilization.

Accordingly, it is the main object of this invention to suspend a vehicle by improved magnetic means. A permanent magnet is associated with electromagnetic means and preferably interposed therebetween for suspension of the vehicle from the track. The permanent magnet provides a substantial part, preferably a major part of the total magnetic flux across the air gap between the track and the magnets. The electromagnets provide a minor part of the aforesaid total magnetic flux, mainly or only for stabilization of the air gap clearance. In a preferred embodiment of the invention, the electromagnets suitably provide one-third of the total magnetomotive force, and their coils accordingly require only one-third of the magnetizing current and one-ninth of the power that would be needed in the absence of the permanent magnets.

BRIEF DESCRIPTION OF THE DRAWINGS

FIG. 5 is a schematic, perspective view of a second vehicle or train of vehicles according to the invention.

FIG. 6 is a sectional view taken along lines 6—6 of FIG. 5.

FIG. 7 is a perspective view of a detail from FIG. 6, with parts thereof broken away.

FIG. 8 is a perspective view of another detail of FIG. 6.

FIG. 9 is a schematic end view of a third embodiment of the invention.

FIG. 10 is a partial view taken along lines 10—10 of FIG. 9.

FIG. 11 is a partial, sectional view taken along lines 11—11 of FIG. 10 and drawn on a larger scale.

FIG. 12 is a schematic end view of a fourth embodiment.

FIG. 13 is a sectional view generally similar to FIG. 3 but showing a fifth embodiment.

The invention relates to the apparatus shown in these drawings, and to the method of vehicle suspension connected therewith.

DETAILED DESCRIPTION OF THE INVENTION

Figure 1:
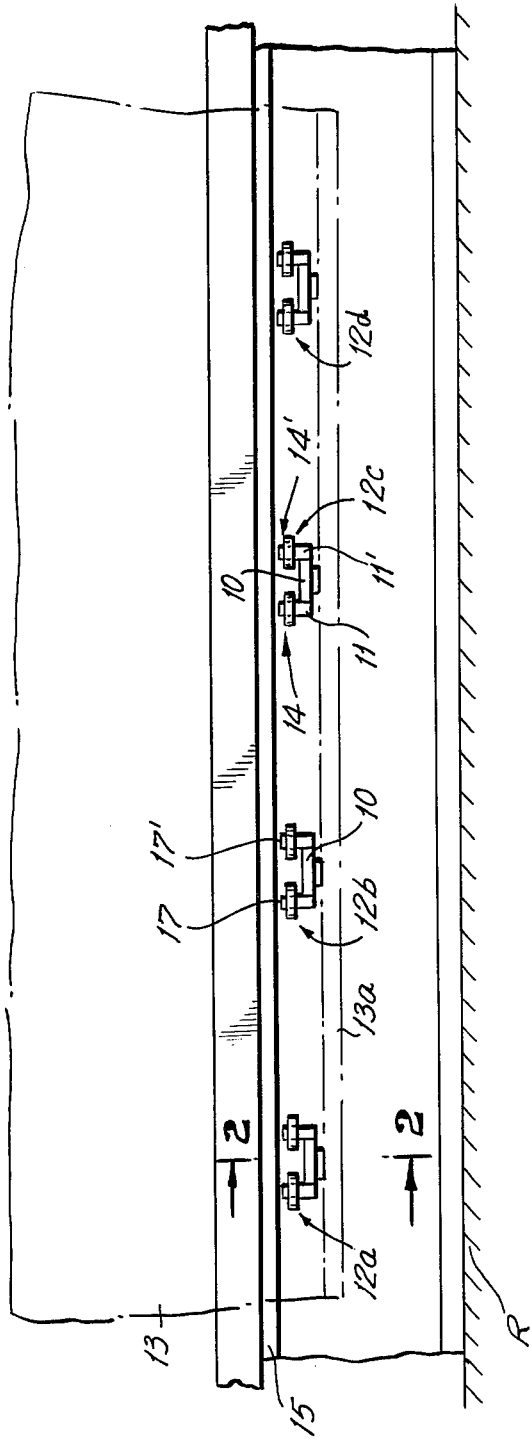
FIG. 1 is a schematic, side-elevational view of a first vehicle and track according to the invention.

FIG. 1 shows vehicle 13, which may be a high-speed passenger car, used either individually or as part of a train. Its outline is shown only in part, and is shown by dash-dot lines, as this invention relates to the car suspension system and not to other car details. The vehicle has a plurality of magnet arrangements 12a, 12b, 12c, 12d, . . . , etc., secured to its lower part, substantially along the length of the vehicle, by support bracket means 13a, on both sides of the vehicle. According to the invention a permanent magnet section 10 is interposed between magnetic poles 11,11' within the magnetic circuit of each magnet arrangement 12, which arrangement can otherwise resemble those used in prior vehicle suspensions.

Figure 2:
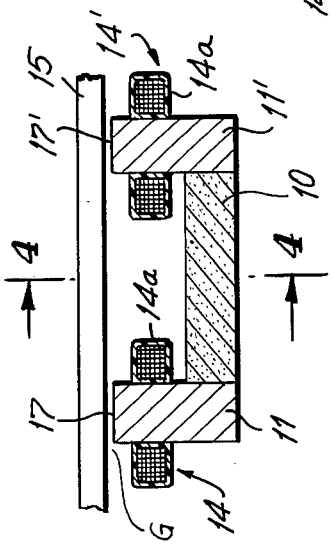
FIG. 2 is a partial, sectional view taken along lines 2—2 of FIG. 1.
Figure 3:
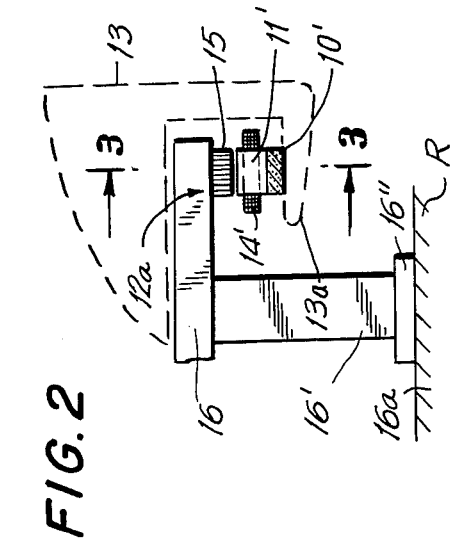
FIG. 3 is a sectional view taken along lines 3—3 of FIG. 2.
Figure 4:
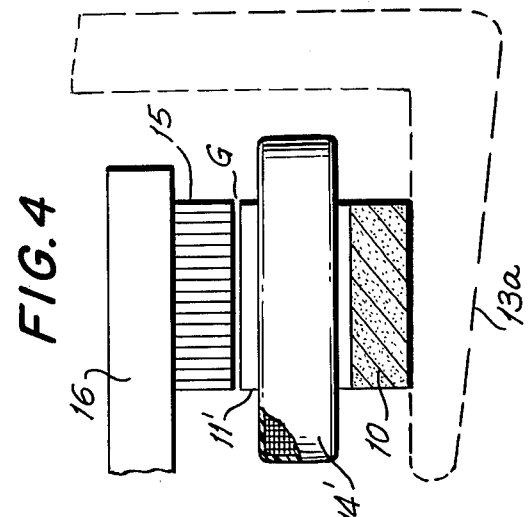
FIG. 4 is a sectional view taken along lines 4—4 of FIG. 3 and drawn on a larger scale.

As best indicated by FIGS. 2 to 4, vehicle 13 is suspended from parallel, continuous, magnetic tracks 15 (only one of which is shown here.) These tracks are secured to bracket ends 12a of beams 16, which in turn rest on posts 16' mounted on support structures 16'' in the roadbed R.

The magnetic arrangements on the vehicle include electro-magnet means 14,14', which according to the invention serve to control air gap clearances and stabilize air gaps G. These air gaps are provided between the underside of track 15 and the upwardly facing pole faces 17 of the magnet arrangements. The gaps are stabilized by regulating the magneto-motive forces of the electromagnets, which together with the permanent magnets control the flux in the air-gaps.

By virtue of the invention, it is generally sufficient to wind the new coils 14, 14' of conductive wire, usually copper or aluminum, 14a and to operate them as conventionally air or liquid cooled magnet coils. It is possible, when required for specific purposes, to use cryogenically cooled, superconductive coils, but it is not generally necessary to incur the cost and complexity of such construction. This is because the addition of permanent magnet elements 10 make it quite possible in a typical application of the invention to reduce the magnetomotive induction needed from the electromagnet coils to perhaps less than one-third of the total induction, and correspondingly to reduce the required electric power losses to one-ninth or less of the electrical energy formerly required. The savings are still greater when the new system is compared with the magneto-repulsive system relying on electromagnetic eddy currents and motion of the vehicle.

In the modified construction of the vehicle as shown in FIGS. 5–7, a vehicle 53 is suspended from magnetic track rails 55, 55' by magnet arrangements 52,52', wherein the combination of permanent magnet means and electromagnet means is somewhat different. These figures also show that different track support brackets 56 can be used on roadbed R and that of course the magnet-supporting brackets of the vehicle can be modified correspondingly.

In magnet arrangement 52, as best shown in FIG. 7, an electromagnet core 51 is provided in form of a horizontal bar parallel to track 55 (in contrast to the generally vertical bar of FIGS. 2–4, one end of which faces the track while some part of the other end is secured to the permanent magnet). As shown in FIG. 7, a single coil 54 is wound about bar 51. On each side of the coil 54, a permanent magnet 50 and, 50a is provided as a pole shoe of the composite magnet arrangement. Steel core 51 of one magnet unit may be integral with the next adjoining unit, as at 51', or they may be magnetically discontinuous.

Coil 54 is energized through a circuit system schematically shown as at 60, 61. The system supplies electric current to energize the electromagnet in degrees which vary in responses to the output of associated means for sensing air gap clearance. The magnetomotive force from the electromagnet coils is usually added to the permanent magnet magnetizing force; although under some control conditions, it may be subtracted. Various sensors for such purposes are known to persons skilled in the art of magnetic suspension. For example, conventional mechanical contact switches, photoelectric transducers, electromagnetic sensors and other devices have been used for such purposes. It is unnecessary to describe them, or any of them, at this point.

It should, however, be noted that at least one such sensor is generally needed at each corner of vehicle 53, for control of the adjacent magnetic suspension coil. By having the magnetization of the electro-magnets responsive to changes of air gap clearance at all four corners, the vehicle can be kept within proper, nominal air gap clearance, for example 15mm, with no greater local variation than ± 3 mm in a typical case.

In order to promote lateral centering of vehicle 53 and thus to avoid yawing motions, as well as for other purposes to be noted later in connection with the operation of the new system, the magnetic arrangement 52 is wider than the track 50, but is provided with upwardly reduced or tapering top portions of the pole shoes, matching the width of the track by the width of upper pole surface 62, as shown between bevelled surfaces 63.

For propulsion of vehicle 53, it is possible to use, for example, an air propeller, air reaction unit or air jet unit 64, indicated in FIG. 5. In many instances, it is preferable to propel the vehicle, instead, by linear electric motors (LEM). Such a motor is suggested by FIG. 8. It comprises a linearly distributed, polyphase wound, electromagnetic stator 84, secured to the underside of the vehicle and energized by current either supplied to the vehicle or generated on it. It reacts with a propulsion track, such as a stationary, ground-supported electrically conductive (aluminum) rail 85. It is possible to use other combinations of propelling motors and of their tracks that also aid in transverse stabilization; and, for present purposes it is unnecessary to discuss their further details.

For further modification of the vehicle, reference is made to FIGS. 9–11. Magnet arrangements 92, 92' of a vehicle 93 have coils 94 somewhat similar to those of FIGS. 2 to 4, but have different combinations of electromagnetic cores, such as for example magnetically oriented silicon steel, which permits a significant reduction in the cross-section of that part of the core, and permanent magnets. The steel cores in this case are formed to provide pole shoes 91, 91a, and are integral with a bar 91b of non-magnetic material which interconnects these shoes. The bar also supports the permanent magnet 90, that may be structurally weak, which is formed as a parallel bar. As in the construction of FIG. 7, the magnetic arrangement again is generally wider than the track, but the pole shoes may be bevelled to match the track width.

It will be understood by persons skilled in the art of magnetic devices that the illustrated arrangements can be modified in many other ways, adapting them for different applications of the invention.

It will also be understood from the prior art of vehicular transportion that a great variety of track mounting and the like can be used, again for different applications of the invention. FIG. 12 shows, as an example, a vehicle suspending magnet unit 122 according to the invention, secured to the roof of a monorail car 123 for suspension from magnetic monorail track 125 on trestle 124. Electric current for energization of the gap-stabilizing coils 126 is supplied by on board power sources or by wayside power collection devices. In order to provide safety in cases where the car is overloaded gravitationally or the electromagnetic power system for gap control has broken down, the car may have safety wheels 128, normally clear of contact with the track-supporting monorail 129, but located to roll or rest on monorail flanges if necessary.

The operation of each embodiment has been described to some extent, but will be understood more readily, along with the performance of the method provided by this invention, when the following data about its application are considered.

It may be assumed as an example that the invention is used to suspend a rail car of standard size as used in the United States of America, weighing 250,000 pounds with passengers and baggage aboard. Assume an air gap flux density of 60,000 lines per square inch. The resulting magnetic attraction is about 50 lbs. per square inch of air gap cross-section, requiring a total of 5,000 square inches for the car. If this is distributed evenly on both sides of the car, with 50 ft. of effective pole-face length on each side, the width of the pole-face then is about 4 1/8 inches.

It may be assumed further that each magnetic pole-face is 14 inches long, with 7 inches distance between poles. The wave length of a magnetic wave in the track then is $2 \times (14 + 7) = 42$ inches $= 3.5$ ft. At a vehicle speed of 200 miles per hour $= 294$ ft/sec, the resulting frequency of the magnetic wave is 84 cps. With 5 inches track depth, the magnetic flux density in each rail is $1/5 \times 14/2 \times 60,000 = 84,000$ lines per square inch, or 13 kilo-gauss.

The core loss of a low grade silicon (0.5 percent) steel strip at 13 kilo-gauss and 84 cps is about 6.5 watt per pound. The weight of track energized by the car is $80 \times 150 = 12,000$ lbs. (at 80 lb/ft). Therefore the electrical and magnetic energy losses in the track, with a vehicle moving at 200 mph, is $6.5 \times 12 = 78$ kilowatt per car. This requires 180 lbs. of tractive effort to overcome losses in the track, with track laminations 1/32 inch thick. (If they were twice as thick, the hysteresis loss would remain the same but the eddy current loss would quadruple and the drag would be about 400 pounds.

It is therefore necessary for the track to be fabricated of laminations not much thicker than 0.04 inch).

Referring now to the lift-magnet design: a permanent magnet is ordinarily chosen to operate near its maximum external energy product range, typically at 5,000 kilo-gausses remnant magnetization and 600 oersteds coercive force. Therefore, with an air gap flux density of 10,000 kilo-gausses, the cross-section area of the permanent magnet must be twice the area of the air gap, quite aside from the desirability of an upward taper of the poles for lateral stability as already noted.

With a 2 cm length of air gap, between magnet and track, 20,000 oersteds are required for a 10 kilo-gauss field. If the magnetization for the iron circuit is added to the usual fringing flux losses, etc., the length of the permanent magnet pieces is about 14 inches, as assumed above. (A 1 cm gap would reduce it to ca. 8 inches).

Since 1 ampere turn is equivalent to 1.26 oersteds, about 22,300 ampere turns are needed for a 2 cm air gap (or 12,700 ampere turns for 1 cm) when no permanent magnets are used. With the poles and spacings which may be assumed, as noted above, about 50 square inches of coil cross-section are available, thus calling for more than 600 amperes per square inch of copper — a current density leading to a prohibitive temperature rise in excess of 150°C. The energy requirement would be over 600 watts per coil or 35 kilowatts per car with 56 coils.

When permanent magnets are used according to the invention, the electromagnetic coils are needed only as plus or minus verniers or modifiers in the magnetic circuit. If they provide one-half the mmf (magnetomotive force) of the permanent magnets (one-third of the total), their energy requirement drops to less than 9 KW per car, and their temperature rise is about 35°C. — an acceptable figure without special cooling provisions.

Therefore, a magnetic vehicle suspension that has ordinarily required supercooled coils, can now be effected with plan air-cooled coils according to the invention. In view of the data and calculations of track design, noted above, the magnetic suspension according to the invention is quite practical at speeds upward of 200 mph — an operation not practically feasible with the former magnetic suspensions.

The preceding descriptions are for magnetic suspension systems in which electromagnet coils are in series with permanent magnets, as buck or boost vernier flux controls. As indicated in FIG. 13 it is also practical to use parallel magnetic suspensions in which the maximum available flux from the permanent magnets PM will not support the vehicle weight, but supplemental variable flux electromagnetic lifting magnets EM are added for the additional lift needed.

What is claimed is:

1. In a vehicle for magnetic suspension: a number of permanent magnets secured to the vehicle, with a number of electromagnets secured endwise to the permanent magnets; the combined magnets having poles spaced along a track and facing upwardly for attraction to the track, each said electromagnet having a core comprising a substantially vertical bar with one end surface facing the track and a surface of another end portion secured to the permanent magnet.

2. In a vehicle according to claim 1 wherein said magnets are wider than said track but their pole-faces are reduced in width to match the width of the track.

3. In a vehicle according to claim 2, wherein the permanent magnets are about twice as large in cross-section as the pole faces.

4. In a vehicle according to claim 2, wherein said poles are provided for said permanent magnets.

5. In a vehicle according to claim 2, wherein said poles are provided in said electromagnets.

6. In a vehicle according to claim 1, wherein said electromagnets have coils wound of plain conductive wire for non-cryogenic operation.

7. In a vehicle according to claim 1, wherein each electromagnet has a core comprising a bar parallel to the track.